US012086356B2

(12) United States Patent
Henmi et al.

(10) Patent No.: US 12,086,356 B2
(45) Date of Patent: Sep. 10, 2024

(54) DISPLAY DEVICE WITH TOUCH PANEL AND TOUCH PANEL

(71) Applicant: Sharp Display Technology Corporation, Kameyama (JP)

(72) Inventors: Takuya Henmi, Kameyama (JP); Satoshi Sekido, Kameyama (JP); Keisuke Kanda, Kameyama (JP); Yuhji Satoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/092,710

(22) Filed: Jan. 3, 2023

(65) Prior Publication Data

US 2023/0229257 A1 Jul. 20, 2023

(30) Foreign Application Priority Data

Jan. 20, 2022 (JP) .................................. 2022-007471

(51) Int. Cl.
*G06F 3/044* (2006.01)
*G06F 3/041* (2006.01)
(52) U.S. Cl.
CPC ........ *G06F 3/04166* (2019.05); *G06F 3/0443* (2019.05)
(58) Field of Classification Search
None
See application file for complete search history.

(56) References Cited

U.S. PATENT DOCUMENTS

| 9,383,874 | B2* | 7/2016 | Lee ........................ G06F 3/0443 |
| 2012/0044203 | A1* | 2/2012 | Ishizaki ............... G06F 3/04166 |
| | | | 345/173 |
| 2013/0278564 | A1 | 10/2013 | Nagata et al. |
| 2017/0003780 | A1* | 1/2017 | Lee ........................ G06F 3/0443 |
| 2017/0357403 | A1* | 12/2017 | Geary ................. G06F 3/04883 |
| 2018/0088726 | A1* | 3/2018 | Gwon ..................... G06F 3/041 |
| 2018/0356953 | A1* | 12/2018 | Jang ...................... G06F 3/0414 |

(Continued)

FOREIGN PATENT DOCUMENTS

| CN | 104199579 A | * | 12/2014 |
| CN | 104281300 A | * | 1/2015 |

(Continued)

*Primary Examiner* — Duane N Taylor, Jr.
(74) *Attorney, Agent, or Firm* — ScienBiziP, P.C.

(57) ABSTRACT

A display device with a touch panel is provided with a transmission touch electrode, a reception touch electrode, a transmission reference electrode formed from the same material as the transmission touch electrode, a reception reference electrode formed from the same material as the reception touch electrode, a reference electrode that faces the transmission reference electrode and to which a predetermined potential is applied, and a touch control circuit that detects a touch by a pointer on the basis of a comparison between a touch detection signal from the reception touch electrode and a detection threshold value. The reception reference electrode outputs a reference signal based on a capacitance formed between the reception reference electrode and the transmission reference electrode, and the touch control circuit changes the detection threshold value in accordance with a change in the reference signal.

9 Claims, 18 Drawing Sheets

(56) References Cited

U.S. PATENT DOCUMENTS

| | | | | |
|---|---|---|---|---|
| 2019/0129556 A1* | 5/2019 | Hwang | ............... | G06F 3/04166 |
| 2021/0191561 A1* | 6/2021 | Kim | ..................... | G06F 3/0441 |
| 2021/0382571 A1* | 12/2021 | Nakanishi | ............ | H03K 17/955 |
| 2021/0408332 A1* | 12/2021 | Yang | ..................... | H01L 27/156 |
| 2023/0004253 A1* | 1/2023 | Shin | ..................... | G06F 3/0446 |
| 2023/0205380 A1* | 6/2023 | Park | ................... | G02F 1/13338 |
| | | | | 345/173 |

FOREIGN PATENT DOCUMENTS

| | | | |
|---|---|---|---|
| CN | 205563527 U | * | 9/2016 |
| JP | 2013222387 A | | 10/2013 |
| WO | 2018029886 A1 | | 2/2018 |

* cited by examiner

|   | A |   |
|---|---|---|
| C | (1,1)=70 (2,1)=70 (3,1)=80 (4,1)=80 (5,1)=90 (6,1)=90<br>(1,2)=65 (2,2)=65 (3,2)=70 (4,2)=70 (5,2)=80 (6,2)=80<br>(1,3)=60 (2,3)=60 (3,3)=60 (4,3)=60 (5,3)=60 (6,3)=60 | D |
|   | B |   |

DISPLAY DEVICE WITH TOUCH PANEL AND TOUCH PANEL

CROSS-REFERENCE TO RELATED APPLICATIONS

This application claims the benefit of priority to Japanese Patent Application Number 2022-007471 filed on Jan. 20, 2022. The entire contents of the above-identified application are hereby incorporated by reference.

BACKGROUND

Technical Field

The disclosure relates to a display device with a touch panel, and to a touch panel.

A display device with a touch panel, and a touch panel is known. For example, such a display device with a touch panel and a touch panel are disclosed in JP 2013-222387 A.

A display device disclosed in JP 2013-222387 A includes a touch panel. The touch panel includes a scanning electrode and a detection electrode. The display device acquires a signal difference between a detection signal that is acquired by the detection electrode touched by a finger when a first drive signal is input to the scanning electrode, and a detection signal that is acquired by the detection electrode touched by the finger when a second drive signal is input to the scanning electrode. The second drive signal has an amplitude different from an amplitude of the first drive signal. Then, the display device acquires an amount of change in the detection sensitivity on the basis of the signal difference and a correction function stored in advance, and increases the voltage value of the drive signal on the basis of a comparison result between the amount of change and a threshold value.

SUMMARY

In the above-described display device disclosed in JP 2013-222387 A, the detection sensitivity is calculated on the basis of the signal obtained by the detection electrode when the touch panel is touched by the finger. Because the magnitude of the detection signal changes due to the position, on the touch panel, touched by the finger or a state of the finger (pointer), the voltage value of the drive signal cannot be corrected appropriately. As a result, when the detection electrode (touch electrode) deteriorates over time, there is a problem in that a touch cannot be detected accurately.

Thus, the disclosure has been conceived in order to solve such a problem as described above, and an object of the disclosure is to provide a display device with a touch panel, and a touch panel that can detect a touch even when a touch electrode deteriorated over time.

In order to solve the problem described above, a display device with a touch panel according to a first aspect of the disclosure includes a touch electrode configured to output a touch detection signal, a value of the touch detection signal changing depending on a presence or absence of a touch by a pointer, a display disposed at a position overlapping the touch electrode in a plan view, a reference touch electrode formed from the same material as the material of the touch electrode, a reference electrode disposed facing the reference touch electrode, a predetermined potential being applied to the reference electrode, and a control circuit configured to determine the presence or absence of the touch by the pointer by comparing a value of the touch detection signal with a detection threshold value. The reference touch electrode outputs a reference signal based on a capacitance formed between the reference touch electrode and the reference electrode, and the control circuit changes the detection threshold value in accordance with the change in the reference signal.

A touch panel according to a second aspect includes a touch electrode configured to output a touch detection signal, a value of the touch detection signal changing depending on a presence or absence of a touch by a pointer, a reference touch electrode formed from the same material as the material of the touch electrode, a reference electrode disposed facing the reference touch electrode, a predetermined potential being applied to the reference electrode, and a control circuit configured to determine the presence or absence of the touch by the pointer by comparing a value of the touch detection signal with a detection threshold value. The reference touch electrode outputs a reference signal based on a capacitance formed between the reference touch electrode and the reference electrode, and the control circuit changes the detection threshold value in accordance with the change in the reference signal.

According to the configuration described above, the speed of deterioration over time of the reference touch electrode formed from the same material as the touch electrode is substantially equal to the speed of deterioration over time of the touch electrode. Because the predetermined potential is applied to the reference electrode facing the reference touch electrode, the reference signal based on the capacitance formed between the reference touch electrode and the reference electrode is constant when it is assumed that there is no change due to the deterioration over time. In other words, the change in the reference signal represents the deterioration over time of the reference touch electrode. Thus, by changing the detection threshold value in accordance with the change in the reference signal, the detection threshold value corresponding to the deterioration over time of the touch electrode can be determined, and the touch can be accurately detected even when the touch electrode deteriorates over time.

BRIEF DESCRIPTION OF DRAWINGS

The disclosure will be described with reference to the accompanying drawings, wherein like numbers reference like elements.

FIG. 10 is a partial cross-sectional view of the touch panel 201 according to the second embodiment. The touch panel 201 includes a plurality of transmission reference electrodes 222a.

FIG. 11 is a diagram for describing an example of the determination of the detection threshold value according to the second embodiment.

FIG. 15 is a diagram for describing an example of the determination of the detection threshold value according to the third embodiment.

DESCRIPTION OF EMBODIMENTS

Figure 1:
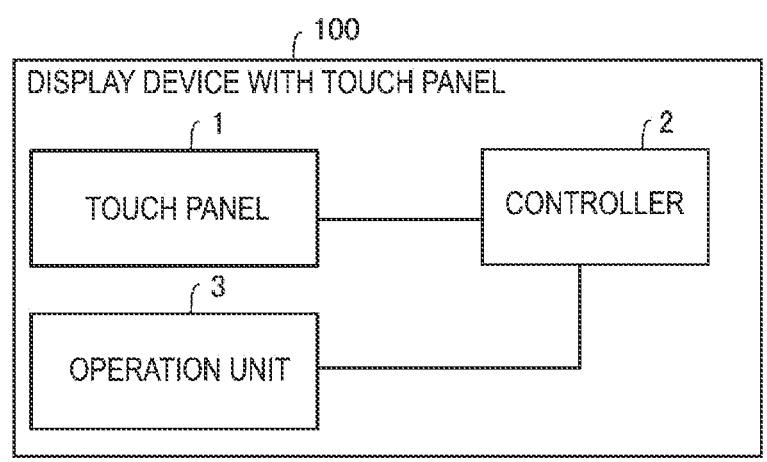
FIG. 1 is a block diagram of a display device with a touch panel 100 according to a first embodiment.

Embodiments of the disclosure will be described below with reference to the drawings. Note that the disclosure is not limited to the following embodiments, and appropriate design changes can be made within a scope that satisfies the configuration of the disclosure. Further, in the description below, the same reference signs are used in common among the different drawings for portions having the same or similar functions, and descriptions of repetitions thereof will be omitted. Further, the configurations described in the embodiments and the modified examples may be combined or modified as appropriate within a range that does not depart from the gist of the disclosure. Further, for ease of explanation, in the drawings referenced below, the configuration is simplified or schematically illustrated, or a portion of the components are omitted. Further, dimensional ratios between components illustrated in the drawings are not necessarily indicative of actual dimensional ratios.

First Embodiment

Figure 2:
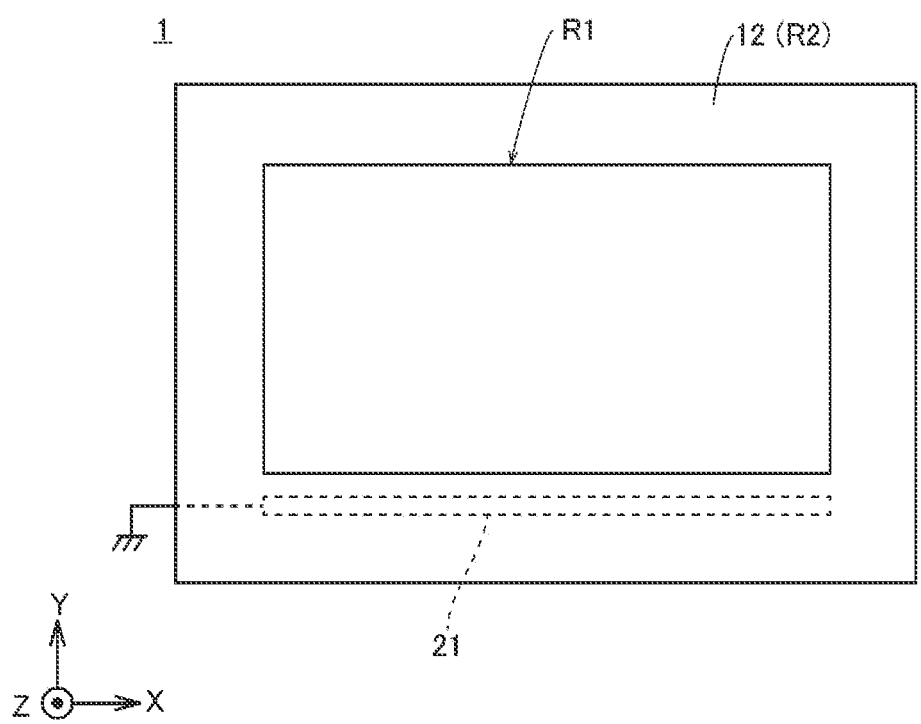
FIG. 2 is a perspective view schematically illustrating a configuration of a touch panel 1.

FIG. 1 is a block diagram of a display device 100 (hereinafter referred to as a "display device 100") with a touch panel, according to a first embodiment. FIG. 2 is a perspective view schematically illustrating a touch panel 1. The display device 100 is configured as a smartphone, a tablet terminal, a smart watch, a head-mounted display, or a personal computer, for example, but is not limited to these examples. As illustrated in FIG. 1, the display device 100 is provided with the touch panel 1, a controller 2, and an operation unit 3. The touch panel 1 is a full in-cell touch panel (in-cell touch panel), for example. Further, the touch panel 1 has a function of detecting a touch by a pointer (finger or pen), and also has a function of displaying a video or an image as a display panel. The controller 2 executes each of control processing in the display device 100 on the basis of a touch detection result acquired from the touch panel 1.

The operation unit 3 is a physical switch, a mouse, a keyboard, and the like, for example. Note that the touch panel 1 may also serve as the operation unit 3. Further, the controller 2 switches states between a "normal state" in which an image is displayed on the touch panel 1 and a "stand-by state" in which the display of the image on the touch panel 1 is stopped. For example, the controller 2 switches from the normal state to the stand-by state when an operation is not performed for a predetermined time period with respect to the operation unit 3 in the normal state. Then, the controller 2 switches from the stand-by state to the normal state when an operation is performed with respect to the operation unit 3 in the stand-by state.

Figure 3:
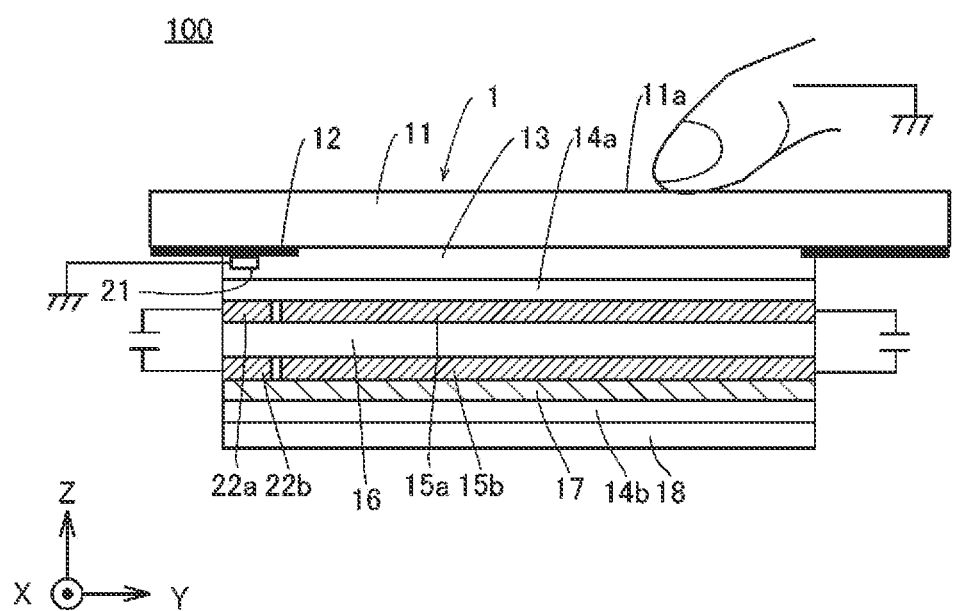
FIG. 3 is a cross-sectional view of the touch panel 1 according to the first embodiment.

FIG. 2 is a plan view of the touch panel 1 according to the first embodiment. FIG. 3 is a cross-sectional view of the touch panel 1 according to the first embodiment. Note that, in FIG. 2, a reference electrode 21 is not visible in a plan view due to a light blocking member 12, but is illustrated by a dotted line for the sake of description. As illustrated in FIG. 2, the touch panel 1 includes a display region R1 in which the light blocking member 12 is not disposed and an image is displayed as a result of light from a backlight 18 (see FIG. 3) passing through a liquid crystal layer 16, and a frame region R2 in which the light blocking member 12 is disposed to block the light from the backlight 18 and the image is not displayed. The frame region R2 is disposed so as to surround the display region R1.

As illustrated in FIG. 3, the touch panel 1 includes a cover member 11, the light blocking member 12, an optical transparent adhesive material 13 (OCA: Optical Clear Adhesive), a polarizer 14a, a transmission touch electrode 15a, the liquid crystal layer 16, a reception touch electrode 15b, a thin film transistor substrate 17, a polarizer 14b, and the backlight 18. The cover member 11, the light blocking member 12, the optical transparent adhesive material 13, the polarizer 14a, the transmission touch electrode 15a, the liquid crystal layer 16, the reception touch electrode 15b, the thin film transistor substrate 17, the polarizer 14b, and the backlight 18 are disposed in this order in the Z direction. In other words, in the touch panel 1, a liquid crystal display, which is constituted by the light blocking member 12, the optical transparent adhesive material 13, the polarizer 14a, the transmission touch electrode 15a, the liquid crystal layer 16, the thin film transistor substrate 17, and the polarizer 14b, is disposed overlapping the reception touch electrode 15b in a plan view. Further, a plurality of the reception touch electrodes 15b are disposed in the display region R1, and the display region R1 is a "touch detection region" in which the plurality of reception touch electrodes 15b are disposed.

The cover member 11 is a transparent glass material, for example. Further, a color filter (not illustrated) is provided on the cover member 11. Further, by touching a touch surface 11a, which is the front surface of the cover member 11, with a pointer, a user performs input with respect to the touch panel 1. The light blocking member 12 is a black matrix that blocks the light from the backlight 18, not to allow the light to pass through to the cover member 11 side. The optical transparent adhesive material 13 is made from a transparent material, and adheres the cover member 11 to the polarizer 14a. Of the light passing through the liquid crystal layer 16, the polarizer 14a transmits only light of a predetermined polarization. The transmission touch electrode 15a and the reception touch electrode 15b are transparent electrodes formed from Indium Tin Oxide (ITO) or Indium Zinc Oxide (IZO), for example. Note that, in FIG. 3, an example is illustrated in which the transmission touch electrode 15a and the reception touch electrode 15b are formed in different layers from each other, but the transmission touch electrode 15a and the reception touch electrode 15b may be formed in the same layer, or the reception touch electrode 15b may be disposed closer to the touch surface 11a than the transmission touch electrode 15a.

Liquid crystal inside the liquid crystal layer 16 illustrated in FIG. 3 is driven by an electric field between a plurality of pixel electrodes (not illustrated) disposed on the thin film transistor substrate 17 and a common electrode (not illustrated) commonly provided with respect to the plurality of pixel electrodes. The polarizer 14b allows only light of a predetermined polarization to be incident on the liquid crystal layer 16. The backlight 18 includes LEDs, for example, and irradiates light toward the cover member 11 side. Note that the reception touch electrode 15b may also serve as the common electrode.

The transmission touch electrode 15a and the reception touch electrode 15b form a capacitance. Here, as illustrated in FIG. 3, when the pointer touches the cover member 11, a capacitance is formed between the transmission touch electrode 15a and the pointer having the ground potential, and a capacitance is formed between the reception touch electrode 15b and the pointer having the ground potential. As a result, the magnitude of the capacitance between the transmission touch electrode 15a and the reception touch electrode 15b changes with respect to the magnitude of the capacitance obtained when the cover member 11 is not touched, and when a drive signal is supplied to the transmission touch electrode 15a, the waveform of a touch detection signal output from the reception touch electrode 15b changes. Because the waveform of the touch detection signal output from the reception touch electrode 15b changes, the touch by the pointer can be detected based on the touch detection signal. In the following description, it is assumed that the value of the touch detection signal, when touched, is greater than the value of the touch detection signal when not touched.

Figure 4:
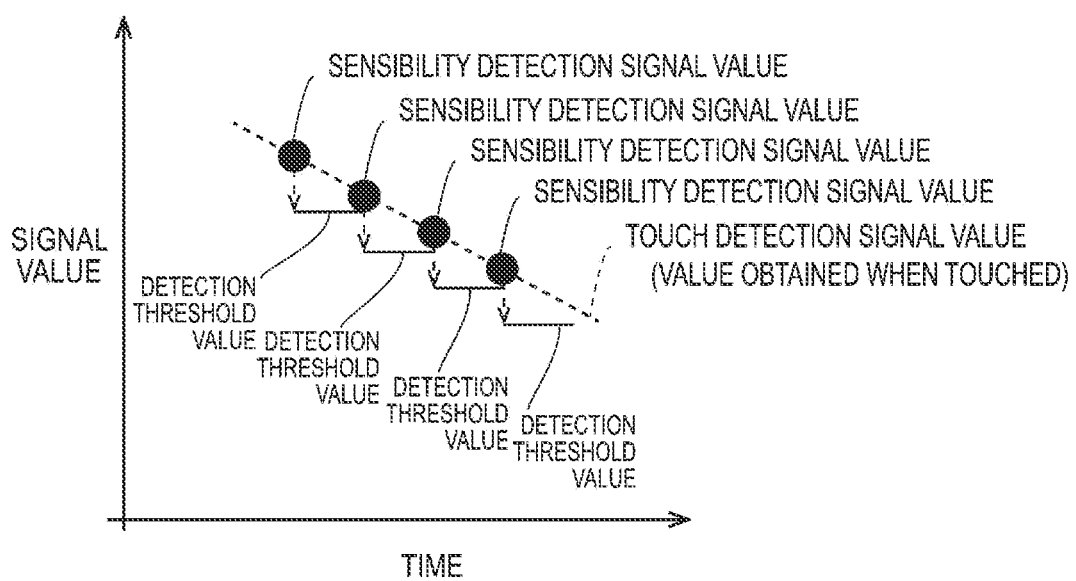
FIG. 4 is a diagram for describing a determination of a deterioration over time and a detection threshold value of a reception touch electrode 15b.

FIG. 4 is a diagram for describing a determination of a deterioration over time and a detection threshold value of the reception touch electrode 15b. The dotted line in FIG. 4 indicates a relationship between the value of the touch detection signal obtained when the reception touch electrode 15b is touched by the pointer and a time period (deterioration over time). As shown in FIG. 4, since the resistance value of the reception touch electrode 15b decreases over time after it is manufactured, the value of the touch detection signal (amplitude of the voltage, for example) output from the reception touch electrode 15b decreases over time. Note that, in FIG. 4, an example is illustrated in which the value of the touch detection signal and the time period have a relationship of a linear function, but the relationship is not limited to this example. The speed of the deterioration (decrease) changes in accordance with the operating environment (temperature and usage frequency) of the display device 100.

As illustrated in FIG. 3, in the first embodiment, the touch panel 1 includes the reference electrode 21, a transmission reference electrode 22a, and a reception reference electrode 22b. The transmission reference electrode 22a is formed in the same layer as the layer in which the transmission touch electrode 15a is formed, and is formed from the same material as the material of the transmission touch electrode 15a. In other words, the transmission reference electrode 22a and the reception reference electrode 22b are transparent electrodes formed from Indium Tin Oxide (ITO) or Indium Zinc Oxide (IZO). Further, the reception reference electrode 22b is formed in the same layer as the layer (touch electrode layer) in which the reception touch electrode 15b is formed, and is formed from the same material as the material of the reception touch electrode 15b. As a result, the speed of progression of the deterioration over time of the reception reference electrode 22b can be aligned with the speed of progression of the deterioration over time of the reception touch electrode 15b. Thus, as will be described below, the detection threshold value aligned with the speed of deterioration over time of the reception touch electrode 15b can be determined appropriately on the basis of a reference signal from the reception reference electrode 22b.

Here, as illustrated in FIGS. 2 and 3, the reference electrode 21, the transmission reference electrode 22a, and the reception reference electrode 22b are disposed at a position overlapping the light blocking member 12 in a plan view. In other words, the reference electrode 21, the transmission reference electrode 22a, and the reception reference electrode 22b are disposed in the frame region R2 provided outside the display region R1 (touch detection region). In this way, a region that is not used as the display region R1 (touch detection region) is effectively utilized.

Further, as illustrated in FIG. 3, the reference electrode 21 is disposed at the back side (opposite side to the touch surface 11a) of the light blocking member 12. Further, in the touch panel 1, the reference electrode 21, the transmission reference electrode 22a, and the reception reference electrode 22b are disposed in this order from the touch surface 11a side. In this way, the reference electrode 21 is disposed between the light blocking member 12 and the reception reference electrode 22b, and also between the light blocking member 12 and the transmission reference electrode 22a. Further, the reference electrode 21 has a predetermined constant potential (ground potential, for example). Then, a capacitance is formed between the reception reference electrode 22b and the transmission reference electrode 22a. A capacitance is formed between the transmission reference electrode 22a and the reference electrode 21. In accordance with a drive signal supplied to the transmission reference electrode 22a, the reception reference electrode 22b outputs, to a touch control circuit 31, a reference signal based on the capacitance formed between the reception reference electrode 22b and the transmission reference electrode 22a. Here, the capacitance formed between the reception reference electrode 22b and the transmission reference electrode 22a is less than a capacitance formed between the reception reference electrode 22b and the transmission reference electrode 22a when the reference electrode 21 is not disposed, by an amount corresponding to the capacitance formed between the transmission reference electrode 22a and the reference electrode 21. In other words, due to the reference electrode 21, the reception reference electrode 22b and the transmission reference electrode 22a are in a state of being touched in a pseudo manner. In this way, the value of the reference signal (amplitude of the voltage, for example) becomes proportional to the value of the touch detection signal obtained when the display region R1 (touch detection region) is touched. Preferably, the dimensions and area of the reference electrode 21, the distance between the reference electrode 21 and the transmission reference electrode 22a, and the distance between the reference electrode 21 and the reception reference electrode 22b are set so that the value of the reference signal output from the reception reference electrode 22b is equal to or less than (more preferably equal to) the value of the touch detection signal obtained when touched as described above. In this way, the value of the touch detection signal obtained when touched becomes equal to or less than the detection threshold value.

Note that, in FIG. 3, an example is illustrated in which the transmission reference electrode 22a and the reception reference electrode 22b are formed in different layers from each other, but the transmission reference electrode 22a and the reception reference electrode 22b may be formed in the same layer, or the reception reference electrode 22b may be disposed closer to the reference electrode 21 side than the transmission reference electrode 22a. Further, as will be described below, as long as the reception reference electrode 22b can output a reference signal having a value corresponding to the touch detection signal, the reference electrode 21 may be disposed closer to the backlight 18 side than the transmission reference electrode 22a and the reception reference electrode 22b.

Note that, in FIG. 3, the transmission reference electrode 22a and the transmission touch electrode 15a are illustrated as having a gap therebetween, but the transmission reference electrode 22a and the transmission touch electrode 15a may be connected to each other. In this case, drive signals are supplied from the touch control circuit 31 simultaneously to both the transmission reference electrode 22a and the transmission touch electrode 15a. However, by causing a time period in which the touch detection signal from the reception touch electrode 15b is detected and a time period in which the reference signal from the reception reference electrode 22b is detected to be different time periods, the touch detection signal and the reference signal can be distinguished from each other and acquired separately.

Figure 5:
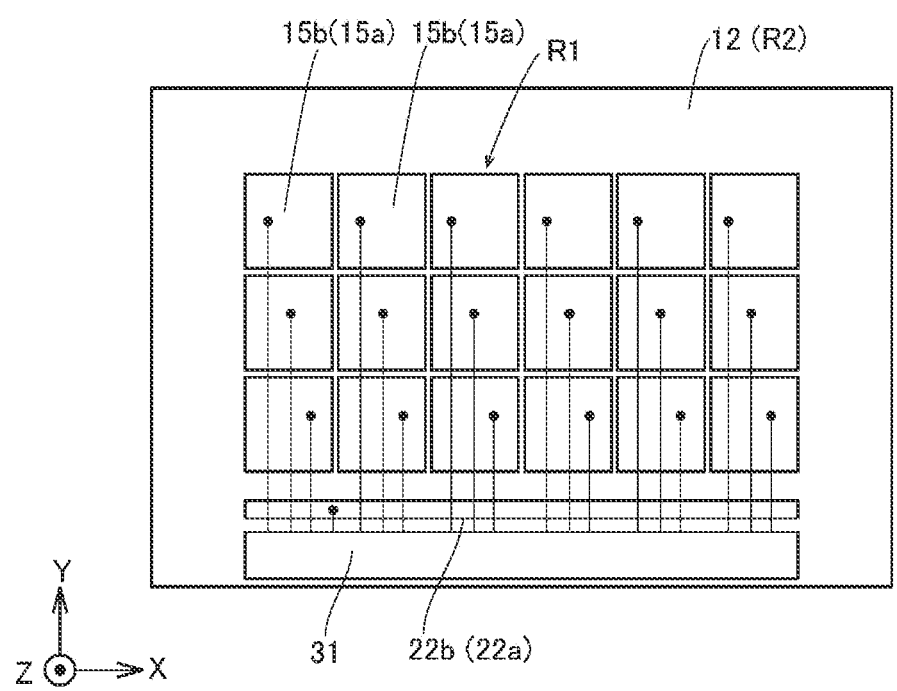
FIG. 5 is a diagram for describing an arrangement relationship between the reception touch electrodes 15b and a reception reference electrode 22b of the touch panel 1.

FIG. 5 is a diagram for describing an arrangement relationship between the reception touch electrode 15b and the reception reference electrode 22b of the touch panel 1. As illustrated in FIG. 5, a plurality of the reception touch electrodes 15b are provided. The plurality of reception touch electrodes 15b are disposed in a matrix shape, for example. Further, in the same manner as the reception touch electrodes 15b, a plurality of the transmission touch electrodes 15a (see FIG. 3) are provided and disposed in a matrix shape. Further, the touch control circuit 31 is disposed in the touch panel 1. The touch control circuit 31 supplies a drive signal (pulsed signal) to the transmission touch electrodes 15a and the transmission reference electrode 22a in accordance with a control signal from the controller 2. Then, the touch control circuit 31, the plurality of reception touch electrodes 15b, and the reception reference electrode 22b are connected to each other by a wiring line 31a. The touch control circuit 31 acquires the touch detection signal from each of the plurality of reception touch electrodes 15b, and acquires the reference signal from the reception reference electrode 22b. Note that when the drive signals are supplied to the plurality of transmission touch electrodes 15a in a time division manner, the plurality of reception touch electrodes 15b may be connected to each other. Further, when the touch detection signals are acquired from the plurality of reception touch electrodes 15b in the time division manner, the plurality of transmission touch electrodes 15a may be connected to each other. Further, in FIG. 5, the reception reference electrode 22b and the reception touch electrode 15b are illustrated as having a gap therebetween, but the reception reference electrode 22b and the reception touch electrode 15b may be connected to each other. In this case, when the drive signals are supplied from the touch control circuit 31 to the transmission reference electrode 22a and the transmission touch electrode 15a during separate time periods, the touch detection signal can be detected during the time period in which the drive signal is supplied to the transmission touch electrode 15a, and the reference signal can be detected during the time period in which the drive signal is supplied to the transmission reference electrode 22a.

As shown in FIG. 4, in the first embodiment, when the touch control circuit 31 acquires the reference signal, the touch control circuit 31 determines the detection threshold value to be a value that is less than the value of the reference signal by a predetermined value. Then, the touch control circuit 31 compares the value of the touch detection signal with the detection threshold value, and detects the presence or absence of the touch on the basis of the comparison result. The touch control circuit 31 outputs, to the controller 2, coordinates of the reception touch electrode 15b that has output a touch detection signal equal to or greater than the detection threshold value. In other words, the touch control circuit 31 determines that the position of the reception touch electrode 15b that has output the touch detection signal equal to or greater than the detection threshold value has been touched by the pointer. Note that, in FIG. 4, an example is illustrated in which the detection threshold value is determined to be a value that is less than the value of the reference signal by the predetermined value, but the detection threshold value may be set to be the same value as the value of the reference signal.

According to the configuration described above, the speed of deterioration over time of the transmission reference electrode 22a and the reception reference electrode 22b formed from the same material as the material of the transmission touch electrode 15a and the reception touch electrode 15b is substantially equal to the speed of deterioration over time of the transmission touch electrode 15a and the reception touch electrode 15b. Because a predetermined potential is applied to the reference electrode 21 facing the transmission reference electrode 22a, the reference signal based on the capacitance formed between the transmission reference electrode 22a and the reference electrode 21 is constant when it is assumed that there is no change due to the deterioration over time. In other words, the change in the reference signal represents the deterioration over time of the transmission reference electrode 22a and the reception reference electrode 22b. Thus, by changing the detection threshold value in accordance with the change in the reference signal, the detection threshold value corresponding to the deterioration over time of the transmission touch electrode 15a and the reception touch electrode 15b can be determined, and the touch can thus be accurately detected even when the transmission touch electrode 15a and the reception touch electrode 15b deteriorate over time. Further, because the detection threshold value is determined to be a value equal to or less than the value of the reference signal having a value corresponding to the touch detection signal obtained when the reception touch electrode 15b is touched by the pointer, the detection threshold value can be determined without using a correction function. Then, even when the speed of deterioration over time of the reception touch electrode 15b changes due to the operating environment of the touch panel 1, the detection threshold value is determined in accordance with the deterioration over time of the reception reference electrode 22b operating under the same operating environment as the operating environment of that reception touch electrode 15b. Thus, the detection threshold value can be determined to be an appropriate value, unlike in a case where the detection threshold value is determined using a correction function assuming a predetermined deterioration over time. As a result of this, whatever the speed of the deterioration over time of the reception touch electrode 15b is, the touch can be appropriately detected.

Further, in the first embodiment, when the power supply for the touch control circuit 31 is started (when the power supply is turned on), or when the stand-by state transitions to the normal state, the touch control circuit 31 acquires the reference signal from the reception reference electrode 22b, and determines the detection threshold value based on that reference signal. In other words, the touch control circuit 31 determines the detection threshold value when it is activated, and after that, does not perform processing for determining the detection threshold value until the power supply is turned off and then turned on once again. Further, when the stand-by state is temporarily obtained and then transitions to the normal state, the touch control circuit 31 determines the detection threshold value, and after that, does not perform the processing for determining the detection threshold value.

Method for Controlling Touch Panel 1 According to First Embodiment

Figure 6:
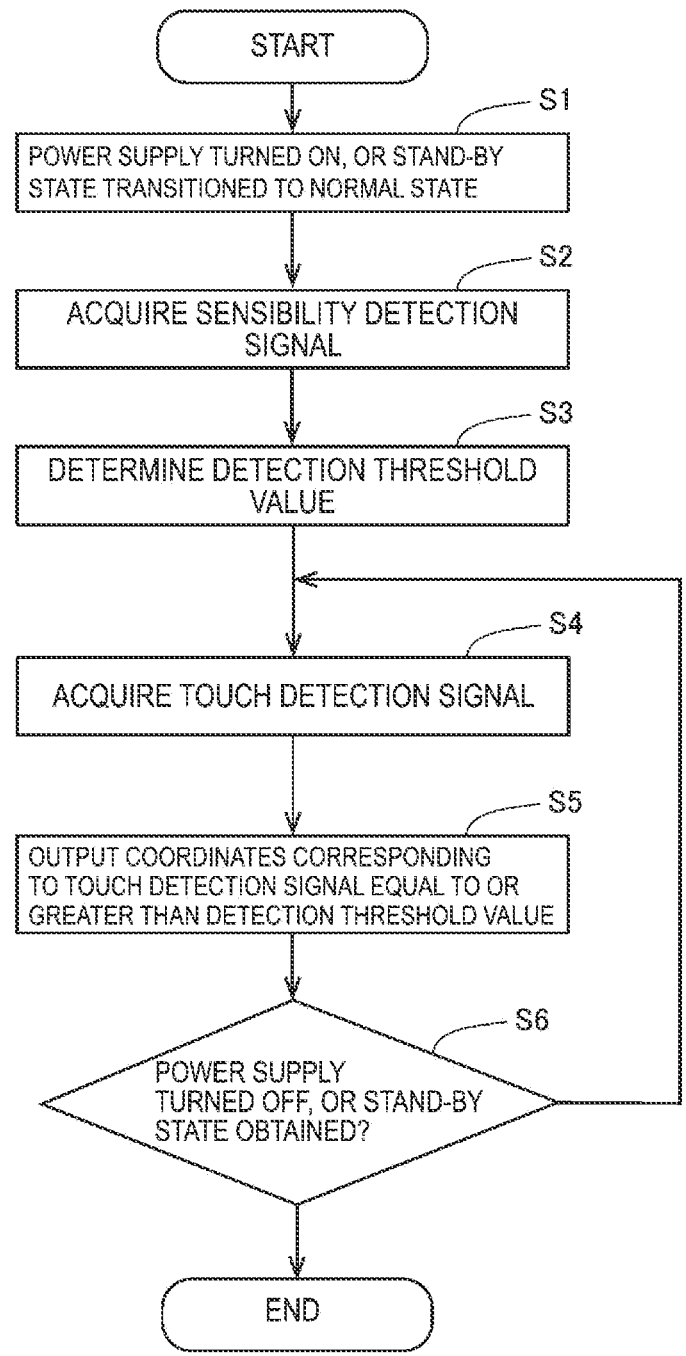
FIG. 6 is a flowchart for describing control processing of the touch panel 1 according to the first embodiment.

Next, a control method of the touch panel 1 will be described with reference to FIG. 6. FIG. 6 is a flowchart for describing control processing of the touch panel 1 according to the first embodiment. The control processing of the touch panel 1 is executed by the touch control circuit 31.

At step S1, when the power supply is turned on, or when the stand-by state transitions to the normal state, the processing proceeds to step S2. In other words, when the power supply for the touch control circuit 31 is started, or when an operation is performed with respect to the operation unit 3 in the stand-by state, the processing proceeds to step S2.

At step S22, the reference signal is acquired. Then, at step S3, the detection threshold value is determined to be a value that is less than the reference signal by the predetermined value. After that, the processing proceeds to step S4.

At step S4, the touch detection signal is acquired from each of the plurality of reception touch electrodes 15b. Then, at step S5, the touch detection signal is compared with the detection threshold value, and coordinates corresponding to the touch detection signal that is equal to or greater than the detection threshold value are output to the controller 2.

At step S6, it is determined whether the power supply has been turned off, or the normal state has transitioned to the stand-by state. When the power supply has been turned off, or the normal state has transitioned to the stand-by state, the control processing of the touch panel 1 is terminated, and when the power supply has not been turned off, and the normal state has not transitioned to the stand-by state, the processing returns to step S4.

According to the control processing described above, even when the reception touch electrode 15b deteriorates over time, the touch detection can be performed accurately.

Second Embodiment

Next, a configuration of a display device with a touch panel 200 (hereinafter referred to as a "display device 200") according to a second embodiment will be described with reference to FIGS. 7 to 11. In the second embodiment, the display device 200 is provided with a plurality of reference electrodes 221 and a plurality of reception reference electrodes 222b. Note that the same configurations as those of the first embodiment will be denoted by the same reference signs as those of the first embodiment, and descriptions thereof will be omitted.

Figure 7:
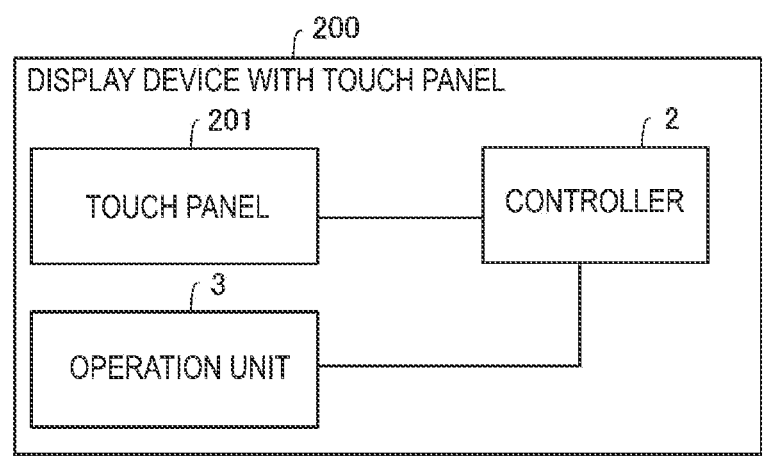
FIG. 7 is a block diagram of a display device 200 according to a second embodiment.
Figure 8:
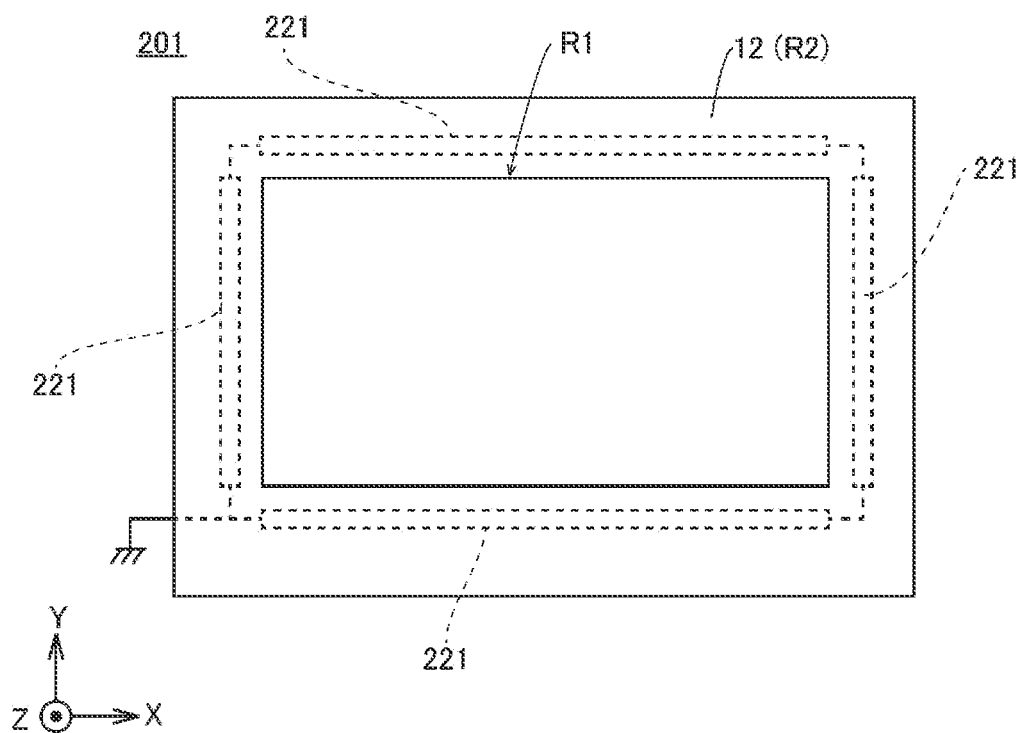
FIG. 8 is a plan view of a touch panel 201.

FIG. 7 is a block diagram of the display device 200 according to the second embodiment. As illustrated in FIG. 7, the display device 200 includes a touch panel 201. FIG. 8 is a plan view of the touch panel 201. In the touch panel 201, the reference electrodes 221 are disposed at positions, on paper, on the upper and lower sides and the left and right sides, respectively, of the rectangular display region R1. In other words, the four reference electrodes 221 are disposed at positions overlapping the light blocking member 12 in a plan view. The four reference electrodes 221 have the ground potential.

Figure 9:
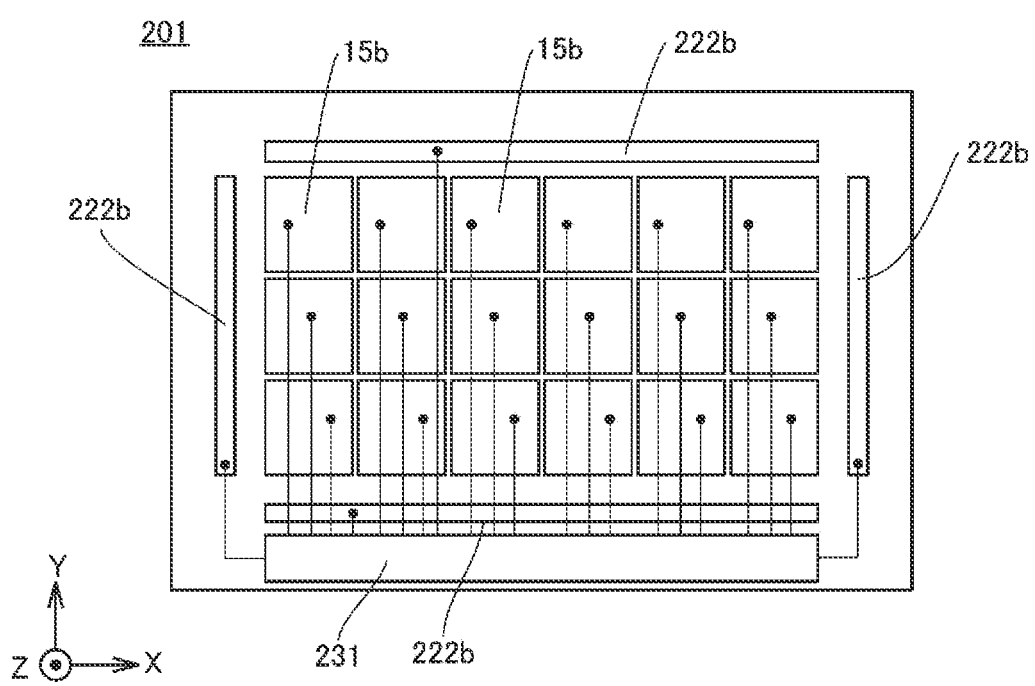
FIG. 9 is a diagram for describing arrangement positions of reception reference electrodes 222b according to the second embodiment.

FIG. 9 is a diagram for describing arrangement positions of the reception reference electrodes 222b according to the second embodiment. As illustrated in FIG. 9, the touch panel 201 includes four of the reception reference electrodes 222b. The four reception reference electrodes 222b are disposed at positions, on paper, on the upper and lower sides and the left and right sides, respectively, of a region in which the plurality of reception touch electrodes 15b are disposed in a matrix shape.

Figure 10:
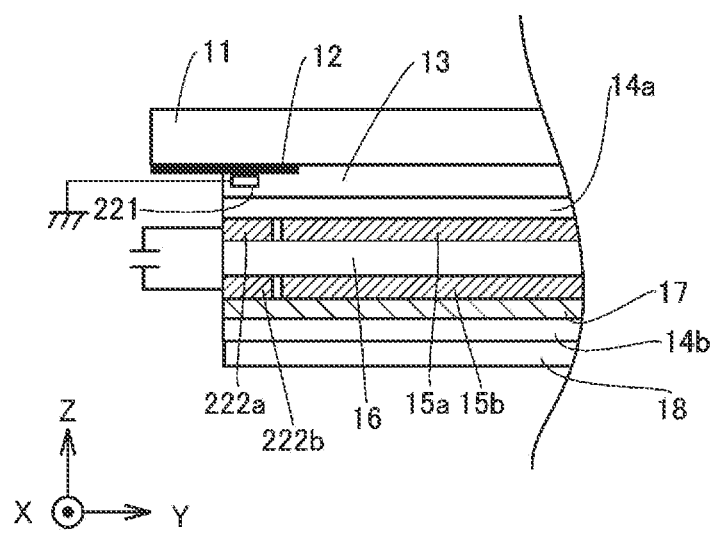

FIG. 10 is a partial cross-sectional view of the touch panel 201 according to the second embodiment. The touch panel 201 includes a plurality of transmission reference electrodes 222a. As illustrated in FIG. 10, the reference electrode 221 is disposed at a position overlapping the reception reference electrode 222b and the transmission reference electrode 222a in a plan view.

Further, as illustrated in FIG. 9, the touch panel 201 includes a touch control circuit 231. The touch control circuit 231 supplies a drive signal to each of the transmission reference electrodes 222a and acquires a reference signal from each of the four reception reference electrodes 222b. In the second embodiment, the touch control circuit 231 determines the detection threshold value corresponding to each of the reception touch electrodes 15b on the basis of the reference signal from each of the four reception reference electrodes 222b. In this way, the detection threshold value can be appropriately determined in accordance with each of the reception touch electrodes 15b, even when the degree of progression of the deterioration over time is different in each of the reception touch electrodes 15b.

FIG. 11 is a diagram for describing an example of the determination of the detection threshold value according to the second embodiment. For example, in FIG. 11, of the four reception reference electrodes 222b, the reception reference electrode 222b on the upper side, on paper, is denoted as "A", the reception reference electrode 222b on the lower side, on paper, is denoted as "B", the reception reference electrode 222b on the left side, on paper, is denoted as "C", and the reception reference electrode 222b on the right side, on paper, is denoted as "D". Further, the touch control circuit 231 determines the detection threshold value for the reception touch electrode 15b for which Y is "1," of the coordinates (X,Y), on the basis of the reference signal from "A", and determines the detection threshold value for the reception touch electrode 15b for which Y is "3," of the coordinates (X,Y), on the basis of the reference signal from "B". Further, the touch control circuit 231 determines the detection threshold value for the reception touch electrode 15b for which Y is "2," of the coordinates (X,Y), on the basis of the reference signals from "A" and "B". For example, the detection threshold value for the reception touch electrode 15b for which Y is "2,", of the coordinates (X,Y), is an intermediate value between the detection threshold value for the reception touch electrode 15b for which Y is "1" and the detection threshold value for the reception touch electrode 15b for which Y is "3."

Further, the touch control circuit 231 determines the detection threshold value for the reception touch electrode 15b for which X is "1" or "2,", of the coordinates (X,Y), on the basis of the reference signal from "C", and determines the detection threshold value for the reception touch electrode 15*b* for which X is "5" or "6," of the coordinates (X,Y), on the basis of the reference signal from "D". Further, the touch control circuit 231 determines the detection threshold value for the reception touch electrode 15*b* for which X is "3" or "4," of the coordinates (X,Y), on the basis of the reference signal from "C" or "D". For example, the detection threshold value for the reception touch electrode 15*b* for which X is "3" or "4," of the coordinates (X,Y), is an intermediate value between the detection threshold value for the reception touch electrode 15*b* for which X is "1" or "2" and the detection threshold value for the reception touch electrode 15*b* for which X is "5" or "6."

For example, when the reference signals from "A" and "D" are "100", the reference signal from "B" is "70", and the reference signal from "C" is "80", the detection threshold value for the reception touch electrode 15*b* at (1,1) is determined to be "70", which is a value less than the less value "80" of the reference signals of "A" and "C" by the predetermined value "10". The detection threshold value for the reception touch electrode 15*b* at (1,3) is determined to be "60", which is a value less than the less value "70" of the reference signals of "B" and "C" by the predetermined value "10". The detection threshold value for the reception touch electrode 15*b* at (2,3) is determined to "65", which is an intermediate value between "70" and "60". Note that a remaining configuration of the second embodiment is the same as the configuration of the first embodiment.

Third Embodiment

Next, a configuration of a display device with a touch panel 300 (hereinafter referred to as a "display device 300") according to a third embodiment will be described with reference to FIGS. 12 to 15. In the third embodiment, a heat source unit 304 is provided in a touch panel 301 of the display device 300. Note that the same components as those of the first or second embodiment will be denoted by the same reference signs as the reference signs of the first or second embodiment, and descriptions thereof will be omitted.

Figure 12:
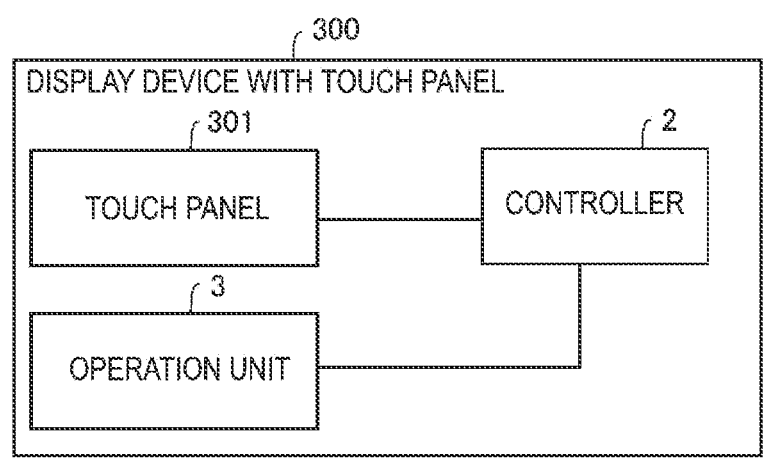
FIG. 12 is a block diagram of a display device 300 according to a third embodiment.
Figure 13:
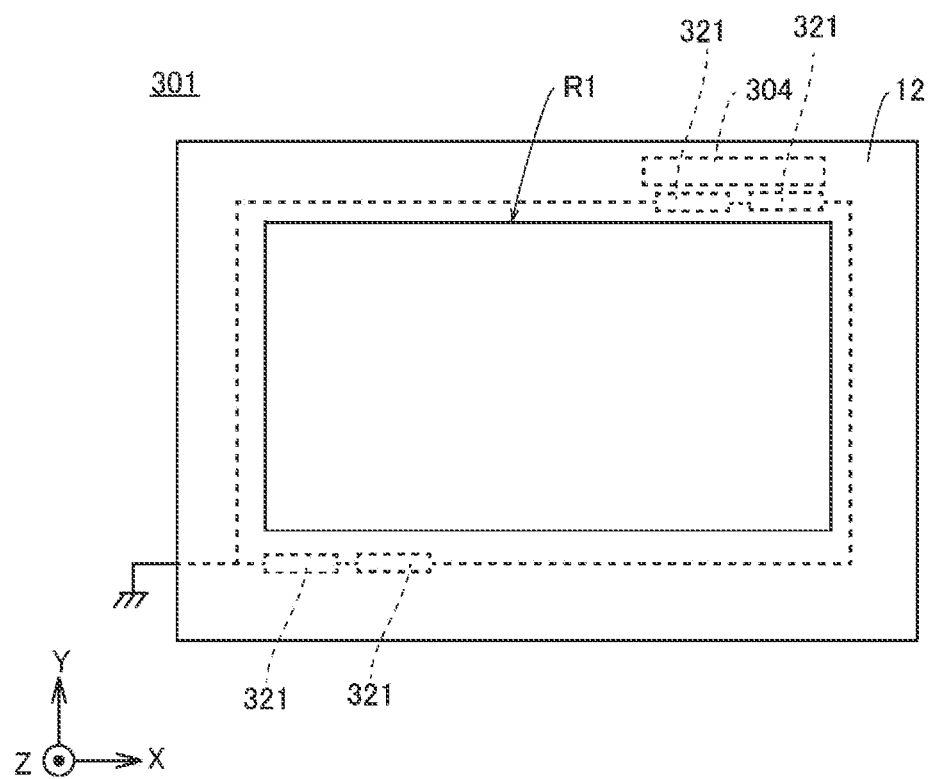
FIG. 13 is a plan view of a touch panel 301.
Figure 14:
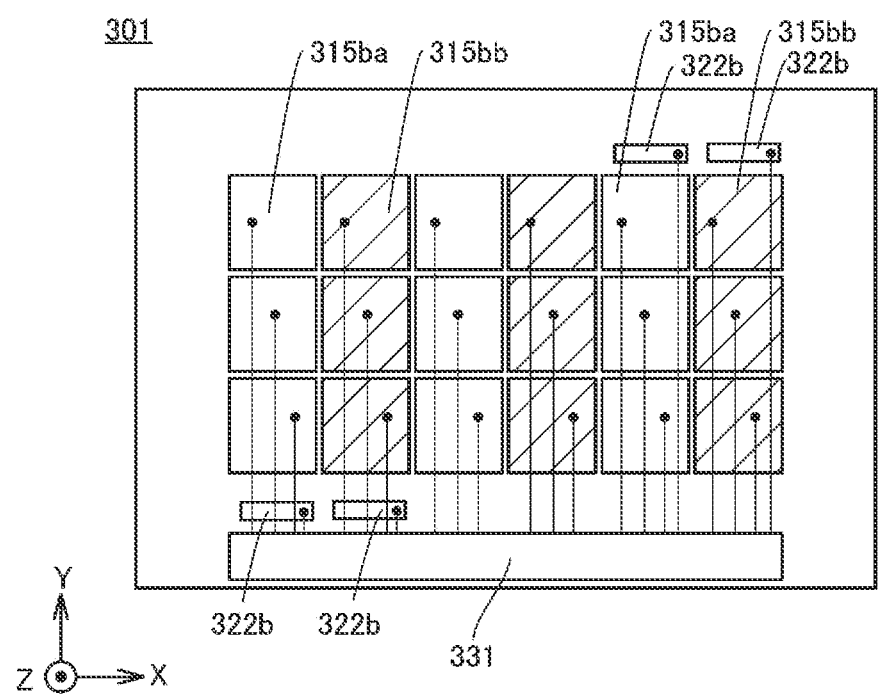
FIG. 14 is a diagram for describing an arrangement of reception reference electrodes 322b according to the third embodiment.

FIG. 12 is a block diagram of the display device 300 according to the third embodiment. As illustrated in FIG. 12, the display device 300 includes the touch panel 301. FIG. 13 is a plan view of the touch panel 301. FIG. 14 is a diagram for describing an arrangement of reception reference electrodes 322*b* according to the third embodiment. As illustrated in FIG. 13, in the touch panel 301, the heat source unit 304 is disposed further on the upper right side, on paper, than the display region R1. The heat source unit 304 is constituted by a light-emitting element such as an LED and a power source circuit or a control circuit, and is a member that generates heat by consuming power. The touch panel 301 includes a plurality of reference electrodes 321 and a plurality of reception reference electrodes 322*b*.

As illustrated in FIGS. 13 and 14, two of the reference electrodes 321 of the plurality of reference electrodes 321 and two of the reception reference electrodes 322*b* of the plurality of reception reference electrodes 322*b* are disposed adjacent to the heat source unit 304. For example, in a plan view, the two reference electrodes 321 and the two reception reference electrodes 322*b* are disposed between the heat source unit 304 and reception touch electrodes 315*ba* and 315*bb*. Further, of the plurality of reference electrodes 321, two of the reference electrodes 321 that are not disposed adjacent to the heat source unit 304, and of the plurality of reception reference electrodes 322*b*, two of the reception reference electrodes 322*b* that are not disposed adjacent to the heat source unit 304 are disposed at positions on the lower left side, on paper (diagonal positions in the display region R1). Here, the deterioration over time of the reception touch electrodes 315*ba* and 315*bb* disposed at positions closer to the heat source unit 304 has a faster progression, and the deterioration over time of the reception touch electrodes 315*ba* and 315*bb* disposed at positions farther from the heat source unit 304 has a slower progression. In this regard, when configured as described above, the detection threshold value can be appropriately determined in accordance with the position relative to the heat source unit 304.

Further, in the touch panel 301, rows in which the plurality of reception touch electrodes 315*ba* are aligned in the Y direction, and rows in which the plurality of reception touch electrodes 315*bb* are aligned in the Y direction are alternately disposed in the X direction. The reception touch electrode 315*ba* and the reception touch electrode 315*bb* are formed from the same material in the same layer, but they are different due to uneven composition ratios generated at the time of manufacturing. As a result, the speed of progression of the deterioration over time is different between the reception touch electrode 315*ba* and the reception touch electrode 315*bb*. In contrast, in the third embodiment, two of the reference electrodes 321 and two of the reception reference electrodes 322*b* are disposed adjacent to the reception touch electrodes 315*ba* and the reception touch electrodes 315*bb*, respectively. In this way, the detection threshold value can be determined in accordance with the speed of progression of the deterioration over time of the reception touch electrode 315*ba* and the reception touch electrode 315*bb*.

Figure 15:
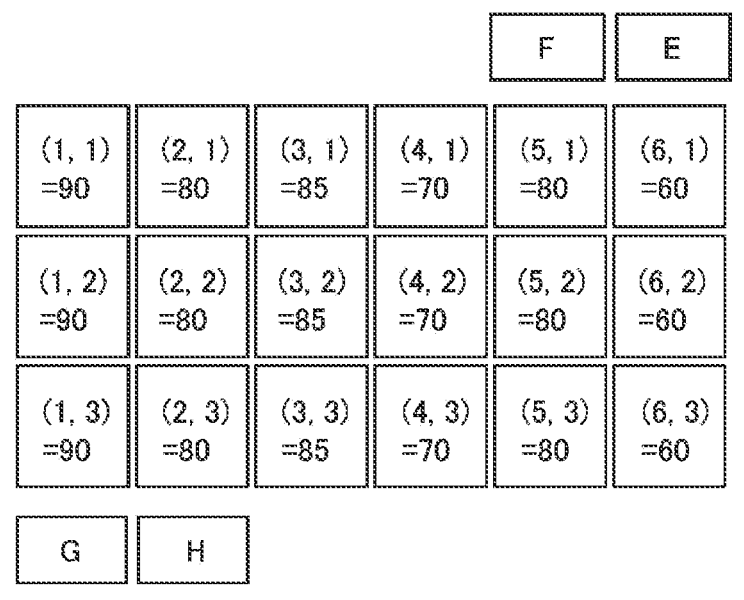

FIG. 15 is a diagram for describing an example of the determination of the detection threshold value according to the third embodiment. For example, in FIG. 15, of the four reception reference electrodes 322*b*, the reception reference electrode 322*b*, of the reception reference electrodes 322*b* adjacent to the heat source unit 304, disposed adjacent to the reception touch electrode 315*bb* is denoted as "E", the reception reference electrode 322*b*, of the reception reference electrodes 322*b* adjacent to the heat source unit 304, disposed adjacent to the reception touch electrode 315*ba* is denoted as "F", the reception reference electrode 322*b*, of the reception reference electrodes 322*b* that are not adjacent to the heat source unit 304, disposed adjacent to the reception touch electrode 315*ba* is denoted as "G", and the reception reference electrode 322*b*, of the reception reference electrodes 322*b* that are not adjacent to the heat source unit 304, disposed adjacent to the reception touch electrode 315*bb* is denoted as "H".

The touch control circuit 331 of the touch panel 301 determines the detection threshold value for the reception touch electrode 315*ba* for which X is "5," of the coordinates (X,Y), on the basis of the reference signal from "F", and determines the detection threshold value for the reception touch electrode 315*bb* for which Y is "6," of the coordinates (X,Y), on the basis of the reference signal from "E". Further, the touch control circuit 331 determines the detection threshold value for the reception touch electrode 315*ba* for which Y is "1," of the coordinates (X,Y), on the basis of the reference signal from "G". Further, the touch control circuit 331 determines the detection threshold value for the reception touch electrode 315*bb* for which Y is "2," of the coordinates (X,Y), on the basis of the reference signal from "H". Further, the touch control circuit 331 determines the detection threshold value for the reception touch electrode 315*ba* for which Y is "3," of the coordinates (X,Y), on the basis of the reference signals from "F" or "G". Further, the touch control circuit 331 determines the detection threshold value for the reception touch electrode 315*bb* for which Y is "4," of the coordinates (X,Y), on the basis of the reference signals from "E" and "H". Note that, in FIG. 15, an example is illustrated in which the reference signal from "E" is "60", the reference signal from "F" is "80", the reference signal from "G" is "90", and the reference signal from "H" is "80". Note that a remaining configuration of the third embodiment is the same as the configuration of the first or second embodiment.

Modified Example of Third Embodiment

A configuration of a touch panel 401 according to a first modified example of the third embodiment, and a configuration of a touch panel 501 according to a second modified example of the third embodiment will be described with reference to FIGS. 16 and 17.

Figure 16:
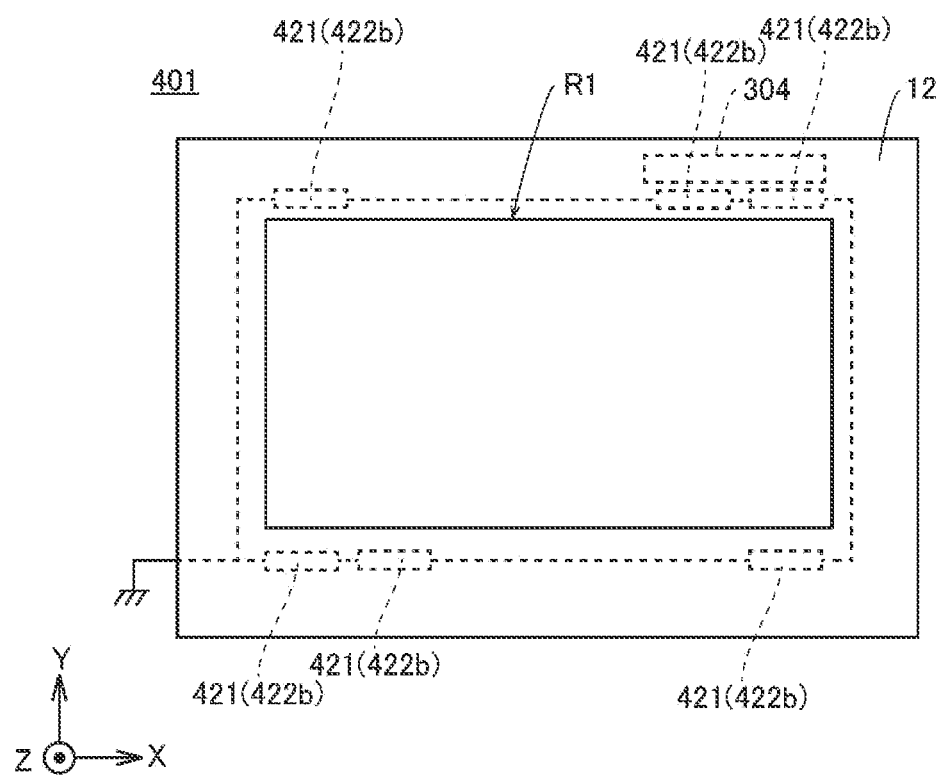
FIG. 16 is a diagram illustrating a configuration of a touch panel 401 according to a first modified example of the third embodiment.

FIG. 16 is a diagram illustrating the configuration of the touch panel 401 according to the first modified example of the third embodiment. As illustrated in FIG. 16, the touch panel 401 includes a plurality of reference electrodes 421 and a plurality of reception reference electrodes 422*b* that are disposed at varied intervals (unequal intervals) in the X direction. In this way, an unevenness in the deterioration over time (deterioration in sensitivity) that cannot be detected by reference electrodes disposed at equal intervals can be detected. Thus, the detection threshold value can be determined more accurately.

Figure 17:
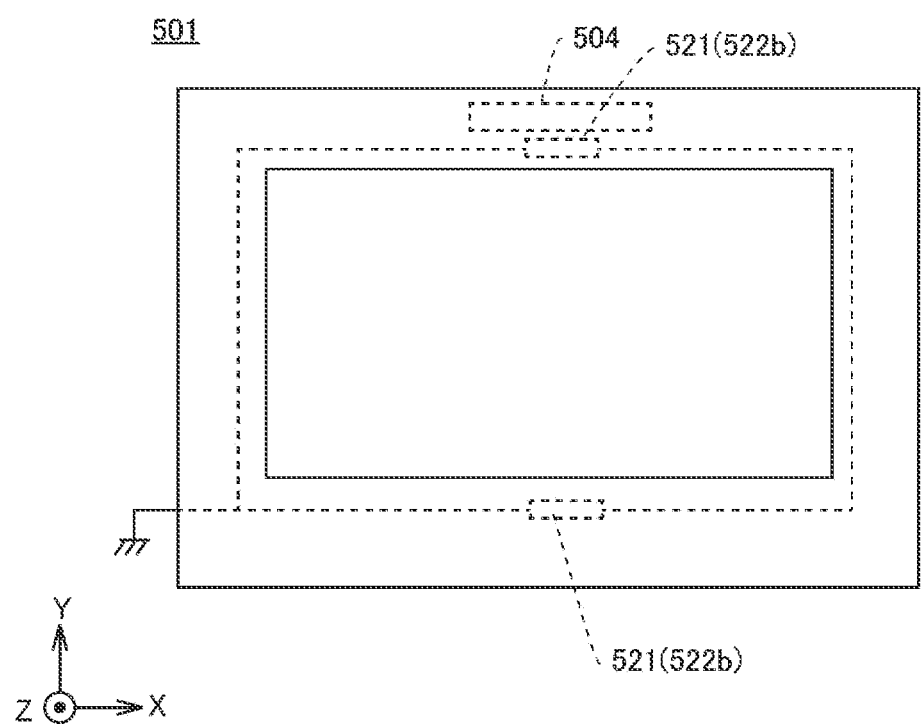
FIG. 17 is a diagram illustrating a configuration of a touch panel 501 according to a second modified example of the third embodiment.

FIG. 17 is a diagram illustrating the configuration of the touch panel 501 according to the second modified example of the third embodiment. As illustrated in FIG. 17, in the touch panel 501, one reference electrode 521 and one reception reference electrode 522*b* are disposed at a position adjacent to a heat source unit 504, and the one reference electrode 521 and the one reception reference electrode 522*b* are disposed at a position that is not adjacent to the heat source unit 504. In this configuration also, the detection threshold value can be determined appropriately in accordance with the position relative to the heat source unit 504.

Embodiments have been described above, but the embodiments described above are merely examples for implementing the disclosure. Thus, the disclosure is not limited to the embodiments described above and can be implemented by modifying the embodiments described above as appropriate without departing from the scope of the disclosure.

(1) Examples of the display device with the touch panel are illustrated in the first to third embodiments described above, but the disclosure is not limited to these examples. For example, the content of the disclosure can also be applied to a touch panel that does not have the function of displaying an image.

(2) In the first to third embodiments described above, an example is illustrated in which the transmission reference electrode and the reception reference electrode are configured separately, but the disclosure is not limited to this example. For example, the reference electrode may be configured as a self-capacitance reference electrode that supplies a drive signal to a reference electrode and acquires a reference signal from that reference electrode.

(3) In the first to third embodiments described above, an example is illustrated in which the detection threshold value is determined to be a value that is less than the value of the reference signal by the predetermined value, but the disclosure is not limited to this example. For example, the detection threshold value may be determined to be a value obtained by multiplying the value of the reference signal with a predetermined value that is 1 or less, or less than 1.

(4) In the first to third embodiments described above, an example is illustrated in which the reference electrode, the transmission reference electrode, and the reception reference electrode are disposed at the position overlapping the light blocking member, but the disclosure is not limited to this example. For example, the reference electrode, the transmission reference electrode, and the reception reference electrode may be disposed in the display region.

(5) In the first to third embodiments described above, an example is illustrated in which the transmission reference electrode and the transmission touch electrode are formed in the same layer, and the reception reference electrode and the reception touch electrode are formed in the same layer, but the disclosure is not limited to this example. For example, the transmission reference electrode and the transmission touch electrode may be formed in different layers from each other, and the reception reference electrode and the reception touch electrode may be formed in different layers from each other.

Figure 18:
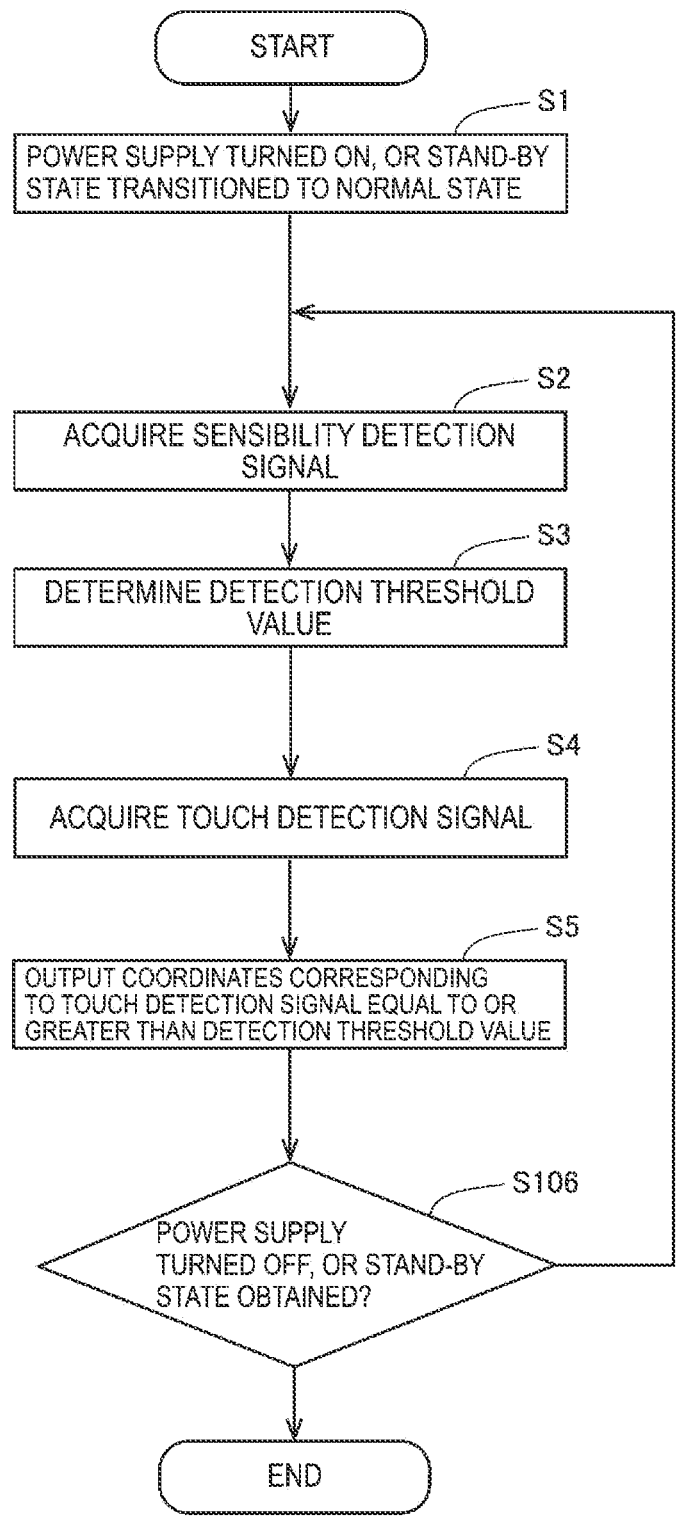
FIG. 18 is a flowchart for describing control processing of a touch panel according to a modified example of the first to third embodiments.

(6) In the first to third embodiments described above, an example is illustrated in which the reference signal is acquired to determine the detection threshold value when the power supply is turned on or when the stand-by state transitions to the normal state, but the disclosure is not limited to this example. For example, in a touch panel according to a modified example of the first to third embodiments, which is illustrated in FIG. 18, the reference signal to determine the detection threshold value is not only acquired when the power supply is turned on or when the stand-by state transitions to the normal state, but the reference signals are repeatedly acquired to determine the detection threshold value until the power supply is turned off or until the stand-by state is obtained. Specifically, as illustrated in FIG. 18, at step S106, when the power supply is not turned off, and when the state is not the stand-by state, the processing returns to step S2, and the reference signal is acquired to determine the detection threshold value.

(7) In the first to third embodiments described above, an example is illustrated in which the reference electrode is configured to have the ground potential, but the disclosure is not limited to this example. For example, the reference electrode may have a positive or negative constant potential, which is not the ground potential.

(8) In the first to third embodiments described above, an example of the touch panel is illustrated in which the value of the touch detection signal when touched is greater than the value of the touch detection signal when not touched, but the disclosure is not limited to this example. For example, the touch panel may be configured such that the value of the touch detection signal when touched is less than the value of the touch detection signal when not touched.

The above-described display device with a touch panel and the touch panel can also be described as follows.

A display device with a touch panel according to a first configuration includes a touch electrode configured to output a touch detection signal, a value of the touch detection signal changing depending on a presence or absence of a touch by a pointer, a display disposed at a position overlapping the touch electrode in a plan view, a reference touch electrode formed from the same material as the touch electrode, a reference electrode disposed facing the reference touch electrode, a predetermined potential being applied to the reference electrode; and a control circuit configured to determine the presence or absence of the touch by the pointer by comparing a value of the touch detection signal with a detection threshold value. The reference touch electrode outputs a reference signal based on a capacitance formed between the reference touch electrode and the reference electrode, and the control circuit changes the detection threshold value in accordance with the change in the reference signal (first configuration).

According to the first configuration described above, the speed of deterioration over time of the reference touch electrode formed from the same material as the touch electrode is substantially equal to the speed of deterioration over time of the touch electrode. Because the predetermined potential is applied to the reference electrode facing the reference touch electrode, the reference signal based on the capacitance formed between the reference touch electrode and the reference electrode is constant when it is assumed that there is no change due to the deterioration over time. In other words, the change in the reference signal represents the deterioration over time of the reference touch electrode. Thus, by changing the detection threshold value in accordance with the change in the reference signal, the detection threshold value corresponding to the deterioration over time of the touch electrode can be determined, and the touch can be accurately detected even when the touch electrode deteriorates over time.

In the first configuration, the display device with the touch panel may further include a light blocking member that blocks light from the display, and the reference electrode may be disposed at a position overlapping the light blocking member in a plan view (second configuration).

According to the second configuration described above, the position overlapping the light blocking member in the plan view is a position that is not used as the display region of the display. Thus, by disposing the reference electrode at the position overlapping the light blocking member in the plan view, the position that is not used as the display region of the display can be effectively utilized.

In the first or second configuration, the reference touch electrode may be disposed on an opposite side to a touch surface with respect to the reference electrode (third configuration).

According to the third configuration described above, the reference electrode is disposed between the reference touch electrode and the touch surface. Thus, even when the pointer touches the touch surface, the touch by the pointer can be prevented from affecting the reference touch electrode.

In any one of the first to third configurations, the reference electrode may be disposed outside a touch detection region in which the touch electrode is disposed (fourth configuration).

According to the fourth configuration described above, a region that is not used as the touch detection region can be effectively utilized.

In any one of the first to fourth configurations, the reference touch electrode may be formed in a touch electrode layer in which the touch electrode is formed (fifth configuration).

According to the fifth configuration described above, the touch electrode and the reference touch electrode can be formed at the same step. As a result, the number of manufacturing steps for the display device with the touch panel can be reduced.

In any one of the first to fifth configurations, the display device with the touch panel may further include an additional touch electrode disposed at a position not overlapping the touch electrode in a plan view, an additional reference electrode having the predetermined potential and disposed at a position not overlapping the reference electrode in a plan view, and an additional reference touch electrode disposed adjacent to the additional touch electrode and configured to output an additional reference signal based on a capacitance formed between the additional reference touch electrode and the additional reference electrode. The control circuit may determine the presence or absence of the touch by the pointer by comparing a value of a touch detection signal from the additional touch electrode with an additional detection threshold value, and may change the additional detection threshold value in accordance with a change in the additional reference signal (sixth configuration).

According to the sixth configuration described above, even when the degrees of progression of the deterioration over time are different between the touch electrode and the additional touch electrode, the detection threshold value and the additional detection threshold value corresponding to the touch electrode and the additional touch electrode, respectively, can be determined.

In the sixth configuration, the display device with the touch panel may further include a heat source unit configured to generate heat by consuming power. The reference touch electrode may be disposed adjacent to the heat source unit, and the additional reference touch electrode may be disposed at a position separated farther from the heat source unit than the reference touch electrode (seventh configuration).

Here, the deterioration over time of the touch electrode disposed at a position closer to the heat source unit has a faster progression, and the deterioration over time of the additional touch electrode disposed at a position farther from the heat source unit has a slower progression. In this regard, according to the seventh configuration described above, the detection threshold value and the additional detection threshold value can be appropriately determined in accordance with the position relative to the heat source unit.

In any one of the first to seventh configurations, the control circuit may acquire the reference signal from the reference touch electrode when a power supply for the control circuit is started (eighth configuration).

According to the eighth configuration described above, every time the power supply for the control circuit is started (every time the power supply is turned on), the reference signal can be acquired to appropriately determine the detection threshold value.

In any one of the first to eighth configurations, the control circuit may acquire the reference signal from the reference touch electrode when a state of stopping display by the display transitions to a state of performing the display by the display (ninth configuration).

According to the ninth configuration described above, when the state of stopping the display by the display (stand-by state) transitions to the state of performing the display by the display (normal state), the reference signal can be acquired. Thus, the detection threshold value can be determined appropriately immediately before the display is performed by the display and the touch is performed.

A touch panel according to a tenth configuration includes a touch electrode configured to output a touch detection signal, a value of the touch detection signal changing depending on a presence or absence of a touch by a pointer, a reference touch electrode including the same material as the material of the touch electrode, a reference electrode configured to generate a state in which a touch is detected by the reference touch electrode and disposed facing the reference touch electrode, a predetermined potential being applied to the reference electrode, and a control circuit configured to determine the presence of the touch by the pointer when the value of the touch detection signal is equal to or greater than a detection threshold value. The reference touch electrode outputs a reference signal based on a capacitance formed between the reference touch electrode and the reference electrode, and the control circuit determines the detection threshold value to be a value that is less than the value of the reference signal (tenth configuration).

According to the tenth configuration described above, a touch panel that can detect the touch can be provided even when the touch electrode deteriorates over time.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device with a touch panel comprising:
   a touch electrode configured to output a touch detection signal, a value of the touch detection signal changing depending on a presence or absence of a touch by a pointer;
   a display disposed at a position overlapping the touch electrode in a plan view;
   a reference touch electrode formed from the same material as a material of the touch electrode;
   a reference electrode disposed facing the reference touch electrode, a predetermined constant potential being applied to the reference electrode;
   a control circuit configured to determine the presence or absence of the touch by the pointer by comparing the value of the touch detection signal with a detection threshold value; and
   a black matrix configured to block light from the display,
   wherein the reference touch electrode outputs a reference signal based on a capacitance formed between the reference touch electrode and the reference electrode,
   the control circuit is further configured to determine the detection threshold value to be a value equal to or less than a value of the reference signal,
   the reference electrode is disposed at a position overlapping the black matrix in the plan view and overlapping the reference touch electrode in the plan view, and
   the reference electrode is sandwiched between the black matrix and the reference touch electrode such that the reference electrode is positioned below the black matrix and above the reference touch electrode in the plan view.

2. The display device with the touch panel according to claim 1,
   wherein the reference touch electrode is disposed on an opposite side of a touch surface with respect to the reference electrode.

3. The display device with the touch panel according to claim 1,
   wherein the reference electrode is disposed outside a touch detection region in which the touch electrode is disposed.

4. The display device with the touch panel according to claim 1,
   wherein the reference touch electrode is formed in a touch electrode layer in which the touch electrode is formed.

5. The display device with the touch panel according to claim 1, further comprising:
   an additional touch electrode disposed at a position without overlapping the touch electrode in the plan view;
   an additional reference electrode having the predetermined constant potential and disposed at a position without overlapping the reference electrode in the plan view; and
   an additional reference touch electrode disposed adjacent to the additional touch electrode and configured to output an additional reference signal based on a capacitance formed between the additional reference touch electrode and the additional reference electrode,
   wherein the control circuit is further configured to:
      determine the presence or absence of the touch by the pointer by comparing a value of a touch detection signal from the additional touch electrode with an additional detection threshold value, and
      determine the additional detection threshold value to be a value equal to or less than a value of the additional reference signal.

6. The display device with the touch panel according to claim 5, further comprising:
   at least one of a light source and an electrical circuit,
   wherein the reference touch electrode is disposed adjacent to the at least one of the light source and the electrical circuit, and
   the additional reference touch electrode is disposed at a position separated farther from the at least one of the light source and the electrical circuit than the reference touch electrode.

7. The display device with the touch panel according to claim 1,
   wherein the control circuit is further configured to acquire the reference signal from the reference touch electrode when a power supply for the control circuit is started.

8. The display device with the touch panel according to claim 1,
   wherein the control circuit is further configured to acquire the reference signal from the reference touch electrode when a state of stopping displaying by the display transitions to a state of performing the displaying by the display.

9. A touch panel comprising:
   a touch electrode configured to output a touch detection signal, a value of the touch detection signal changing depending on a presence or absence of a touch by a pointer;
   a reference touch electrode formed from the same material as a material of the touch electrode;
   a reference electrode disposed facing the reference touch electrode, a predetermined constant potential being applied to the reference electrode;
   a control circuit configured to determine the presence or absence of the touch by the pointer by comparing the value of the touch detection signal with a detection threshold value; and
   a black matrix configured to block light from the display,
   wherein the reference touch electrode outputs a reference signal based on a capacitance formed between the reference touch electrode and the reference electrode, the control circuit is further configured to determine the detection threshold value to be a value equal to or less than a value of the reference signal, the reference electrode is disposed at a position overlapping the black matrix in the plan view and overlapping the reference touch electrode in the plan view, and the reference electrode is sandwiched between the black matrix and the reference touch electrode such that the reference electrode is positioned below the black matrix and above the reference touch electrode in the plan view.

\* \* \* \* \*